(12) United States Patent
Fechner et al.

(10) Patent No.: US 6,978,037 B1
(45) Date of Patent: Dec. 20, 2005

(54) PROCESS FOR RECOGNITION OF LANE MARKERS USING IMAGE DATA

(75) Inventors: Thomas Fechner, Berlin (DE); Stefan Heinrich, Acharn (DE)

(73) Assignee: DaimlerChrysler AG, (DE)

( * ) Notice: Subject to any disclaimer, the term of this patent is extended or adjusted under 35 U.S.C. 154(b) by 222 days.

(21) Appl. No.: 09/704,366

(22) Filed: Nov. 1, 2000

(51) Int. Cl.[7] ............................................. G06K 9/00
(52) U.S. Cl. ................................................... 382/103
(58) Field of Search ............................... 382/103–104, 382/106, 170, 181, 190, 199, 209, 108, 217, 382/266; 340/435, 439; 701/28

(56) References Cited

U.S. PATENT DOCUMENTS

| | | | |
|---|---|---|---|
| 4,868,752 A | | 9/1989 | Fujii et al. |
| 4,970,653 A | | 11/1990 | Kenue |
| 5,247,587 A | * | 9/1993 | Hasegawa et al. ........... 382/168 |
| 5,351,044 A | | 9/1994 | Mathur et al. |
| 5,359,666 A | * | 10/1994 | Nakayama et al. .......... 382/104 |
| 5,517,412 A | * | 5/1996 | Unoura .......................... 701/23 |
| 5,555,312 A | * | 9/1996 | Shima et al. ................. 382/104 |
| 5,904,725 A | * | 5/1999 | Iisaka et al. .................. 701/207 |
| 6,091,833 A | | 7/2000 | Yasui et al. |
| 6,115,505 A | * | 9/2000 | Hashima et al. ............. 382/286 |
| 6,133,824 A | * | 10/2000 | Lee et al. ...................... 340/435 |
| 6,205,234 B1 | * | 3/2001 | Kakinami et al. ........... 382/104 |
| 6,493,458 B2 | * | 12/2002 | Yasui et al. .................. 382/104 |
| 6,813,370 B1 | * | 11/2004 | Arai ............................. 382/104 |

* cited by examiner

*Primary Examiner*—Jose L. Couso
*Assistant Examiner*—Tom Y. Lu
(74) *Attorney, Agent, or Firm*—Pendorf & Cutliff

(57) ABSTRACT

In the inventive process the morphological characteristics of point-shaped vehicle lane markers are evaluated on the basis of a priori knowledge. For this, those estimation processes are particularly useful, which are based on a Kalman Filter. After the selection of suitable ROI a Matched Filter is employed, in order to better extract from the background the image points associated with a vehicle lane marker. The inventive process is obviously not limited to point-shaped vehicle lane markers.

22 Claims, 4 Drawing Sheets

PROCESS FOR RECOGNITION OF LANE MARKERS USING IMAGE DATA

BACKGROUND OF THE INVENTION

1. Field of the Invention

The invention concerns a process for recognition of vehicle lane markings from image data, wherein the morphological characteristics of dot-shaped vehicle lane markings are evaluated on the basis of a priori knowledge.

2. Description of the Related Art

Camera based systems for automatic vehicle tracking and for warning of unintentional deviations from the vehicle track or lane depend upon a reliable recognition of the vehicle lane boundaries. Typically, these boundaries are marked by means of continuous or interrupted lines. It is also known (for example: in the USA) to mark vehicle lane boundaries by a sequence of points (terrain points).

In U.S. Pat. No. 5,351,044, a process for recognition of vehicle lane boundaries is disclosed, which evaluates pixel-based image data. Therein, those image points of which the intensity or brightness significantly exceeds the intensity or brightness of the surrounding or ambient points are assigned to a border.

Further, a process is known which evaluates the correlation of the bordering image cells within the image data for detection of the vehicle lane boundaries. For this it is however necessary to transform the perspective camera data into non-perspective image data.

U.S. Pat. Nos. 5,517,412 and 4,868,752 show processes for detection of the vehicle lane boundaries, which are based on the segmentation of linear elements by means of line detectors ("edge detection") with subsequent Hough-transformation for reconstruction of the boundary. Similar technology is disclosed in U.S. Pat. No. 4,970,653, wherein here the segmentation of the line elements is supported by supplemental template matching.

In the process proposed in U.S. Pat. No. 6,091,833, the area in which linear detection is carried out is curtailed by the selection of areas which, transformed in the frequency space, exhibit a high intensity by their low frequency components.

It is the task of the invention to provide a new process for recognition of vehicle lane markings from image data.

SUMMARY OF THE INVENTION

In the inventive process the morphological characteristics of point-shaped vehicle land markers are evaluated on the basis of a priori knowledge. For this, those estimation processes are particularly useful, which are based on a Kalman Filter. After the selection of suitable ROI a Matched Filter is employed, in order to better extract from the background the image points associated with a vehicle lane marker. The inventive process is obviously not limited to point-shaped vehicle lane markers.

DETAILED DESCRIPTION OF THE INVENTION

In the inventive process, the morphological characteristics of point-shaped vehicle lane markings are considered or evaluated on the basis of a priori or common knowledge. Therein, beginning with a starting image, a multi-step search is made for point-shaped vehicle lane markings ("Bot Dot Markings").

Figure 1:
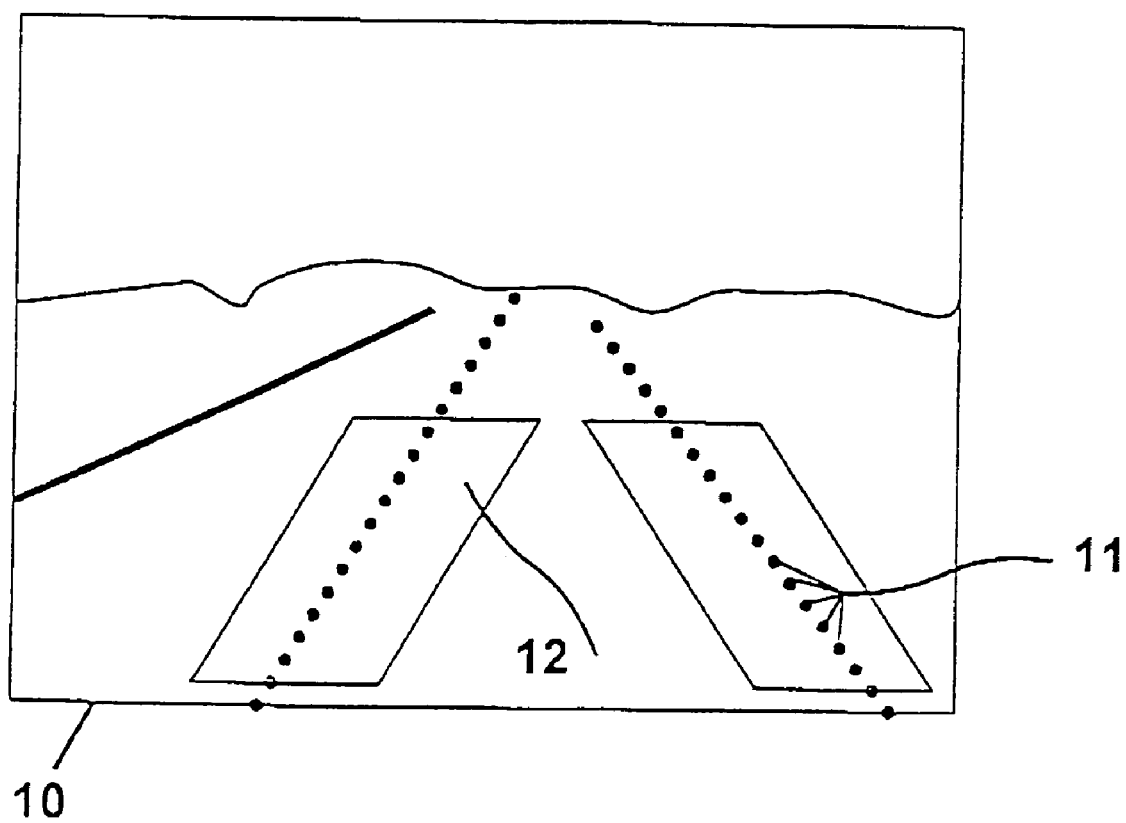
FIG. 1 shows an image section 10 with point-shaped vehicle lane markings 11 and selected areas (ROI) 12.

In FIG. 1 there is shown a preferred manner, in which for minimizing the processing complexity, and, at the same time, for reduction the false alarm likelihood, areas (ROI) 12 to be processed are separated out from the totality of the image data 10. This occurs beginning with a priori knowledge with the goal, to select areas 12, which with high probability contain vehicle lane markings, so called ROI (regions of interest). Herein the positioning of the ROI occurs in effective manner on the basis of the known camera geometry (height, tilt angle, . . . ) as well as on the basis of other perimeters such as for example the geometry of the vehicle track, the dimensions of the vehicle lane markings or the vehicle position within the vehicle lane. Herein it is generally assumed, that the vehicle is situated between left and right markings, and the vehicle lane breadth meets certain standards.

Figure 2:
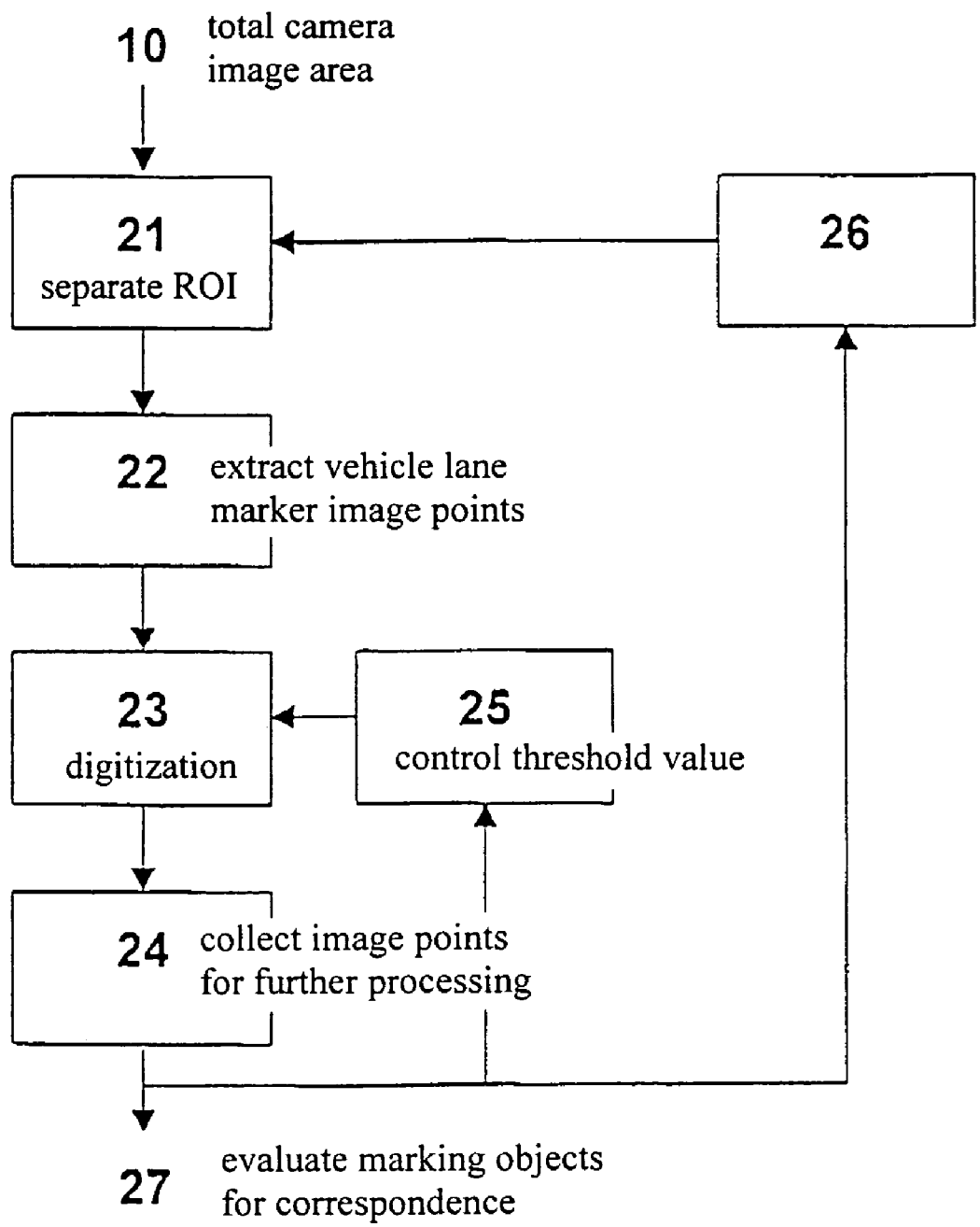
FIG. 2 shows a flow diagram with respect to the recognition of the point-shaped vehicle lane markings 11.

In FIG. 2 there is shown, as an example, the individual steps of the inventive image data processing beginning from camera image 10, which still contains the entire image information, up to the extraction of the coordinates for individual elements of the vehicle lane marking, which in general correspond to the coordinates of marking points.

In a first step 21 areas (ROI) 12 are separated out from the entirety of the image data 10 to be processed. For this, in the initialization of the ROI 12 in the framework of the inventive process model parameters are varied so long until vehicle lane markings are found. Therein, as model parameters there are taken into consideration for example information such as the breadth of the vehicle lane, the positioning or orientation of the camera with respect to the center of the vehicle lane or the yaw angle of the vehicle. In the later course of the process, for repositioning of already initialized ROI 12, parameter predictions from a vehicle-street-model are drawn upon on the principle of a prediction of an evaluation process for parameter determination. For this, evaluation processes are advantageous which are based upon a Kalman-filter. In the repositioning of the ROI 12, it is in advantageous manner controlled by the variation of the result value of the prediction of the evaluation process for parameter determination, wherein the width is adapted proportionally to the size of the variance of the results. It is likewise advantageous to limit the ROI 12 vertically on the basis of a minimal and a maximal distance in the street plane. This is particularly useful when the inventive process is employed at night. Herein in advantageous manner the vertical limitation of the ROI 12 is determined by the range of the maximal illumination (high beam, low beam). It is conceivable that the regulation is controlled by the number of the image points expected to be associated with a vehicle lane marking, wherein this regulation is then considered as optimal when the number of the image or measuring points to be expected is maintained constant over all distance ranges.

According to the number of suitable ROI 12, a matched-filter is employed in process step 22, in order to better extract the image points (pixels) associated with a vehicle lane marking from the background. Herein the matched-filter is advantageously adapted to the shape and size of the vehicle lane marking and/or the statistics of the background being searched.

In particularly advantageous manner, the matched filter is so arranged that in the framework of its application in the environment of the position being examined, the average gray scale or tone value (hereafter gray value) of the background is measured, and that on the presentation of an image point, which is potentially to be associated with a vehicle lane marking, is confined on the basis of a comparison between background noise, the average gray value in the environment, and the gray value of the position to be searched. In general, for this the filter is implemented in separated geometry or model-type, in which the x-y components are presented separately. It has however been found, that for location or determination of point-shaped vehicle lane markings in the most cases, the processing complexity can be reduced, when in the evaluation of the matched filter only the x-components are considered. For this, the average value and the standard deviation right and left of a position to be examined are measured. If the gray value exceeds the average value of the intensity of the background at more than the comparative threshold determined from the white noise of the background and threshold determination, the position is marked as potentially belonging to a vehicle lane marking.

Figure 4:
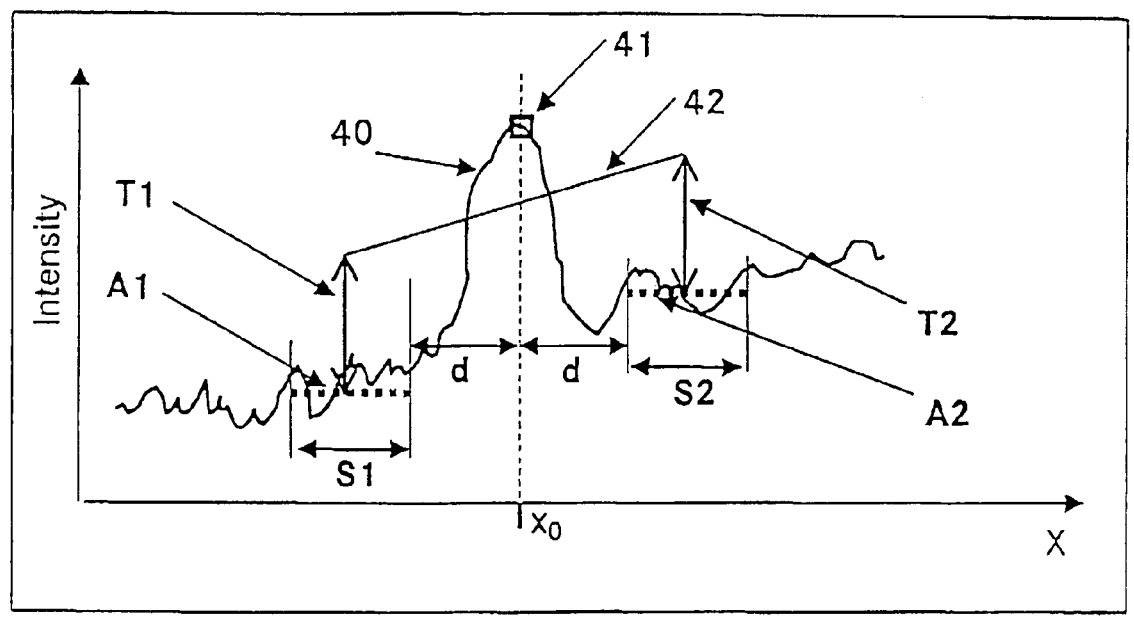
FIG. 4 shows an example of a gray-scale or tonal value processing of image data, wherein the regions evaluated by the matched-filter are extracted.

FIG. 4 shows, as an example, the gray value curve 40 over an image cell to be evaluated within the image data or, as the case may be, the ROI, wherein in this example only the x components are taken into consideration. For evaluation of the image point 41 on the position $x_o$ of the image cell, the intensity thereof as well as the statistical information of two same size areas S1 and S2, which are situated at a distance d of xO therefrom, are evaluated. The distance d is preferably selected to be a value, which is predicated or predicted by the evaluation process for parameter determination in process step 21 (FIG. 2) as the to be expected width of an element of the vehicle lane marking. It is, on the other hand, however also possible to assign the distance d in the framework of the inventive process a fixed value (for example an expected value) and to so leave it. The size of the area or range or field S1 and S2 is in advantageous manner selected to be identical, wherein their measurements, if possible, should not be larger than the predicated or predicted value of an element of the vehicle lane marking. If this predicted value is however so small that no useful statistical evaluation of the values contained in S1 or, as the case may be, S2 any longer appears possible, then the areas or ranges S1 or, as the case may be, S2 can also be selected to be larger. In practice, in the predication of the width of the elements of the vehicle lane markings of two pixels, the selection of five pixels as the width of areas S1 and S2 has been found to be effective.

From the values within areas or ranges S1 or S2, the average values A1 or, as the case may be, A2 and the standard deviation σ1 or, as the case may be, σ2 is calculated. The standard deviation σ1 or, as the case may be, σ2 is subsequently employed for calculation of the threshold values T1 or, as the case may be, T2. Therein, it is conceivable, in a first step or statement or set-up to select the threshold values according to the three-fold of the respective standard deviations, thus to select T1=3 * σ1 and T2=3* σ2. In particularly advantageous manner, the thus generated threshold values are corrected by means of a threshold value controller or regulator 25 described in greater detail in the following. After the determination of the threshold values T1 or, as the case may be, T2 and their subsequent correction, the support points for the comparison threshold 42 is calculated by addition of T1 and A1 or, as the case may be, T2 and A2. Herein the center of the area S1 and S2 is advantageously selected as the x-position of the support point. Subsequently, the value 41 at the position $x_o$ can now be compared with the value of the comparison threshold 42 and the comparison result can in inventive manner be drawn upon for identification of elements of the vehicle lane marking.

Figure 3:
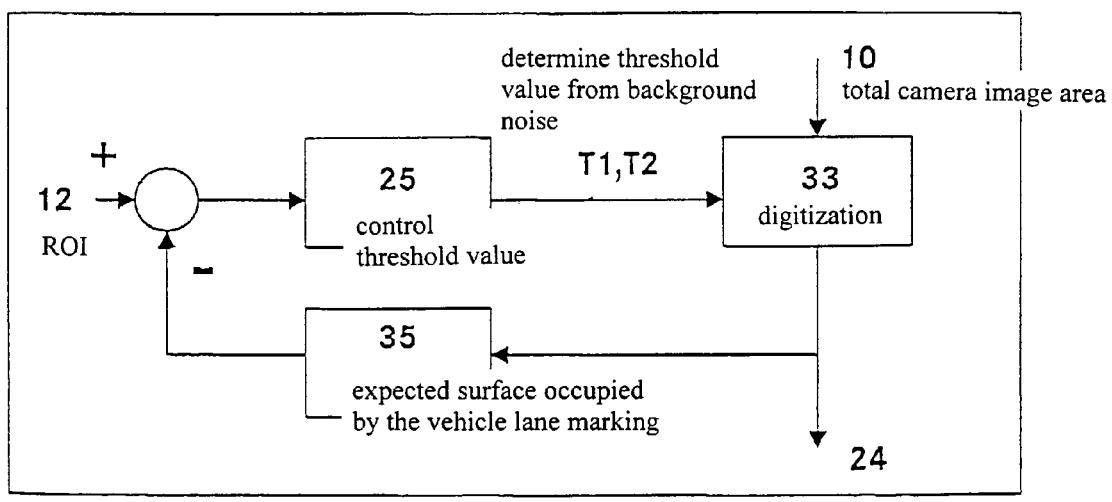
FIG. 3 shows a flow diagram concerning the binarization or digitization of the image point (pixel) which is associated with the vehicle lane boundary 11.

The image point (pixel) identified and extracted by the matched-filter, which is associated with vehicle lane markings, are digitized (conversion to binary) in processing steps 23, 24, and 25 and collected into groups. In the digitization, the intensity of the individual pixels are compared with a threshold value and then the compared pixels are only drawn upon for a further processing when their intensity exceeds this threshold value. In FIG. 3, the inventive process step for digitization is elucidated on the basis of a flow diagram. Herein the threshold value T1 and T2 is determined from the background noise in advantageous manner by means of a threshold value controller 25. For the determination thereof, it is useful when the threshold value controller draws upon a priori knowledge about the expected surface 35 occupied by the vehicle lane marking, which correlates directly with the expected number of the vehicle lane marking associated image points (pixels). In this manner, the threshold value controller 25 can be so set up or arranged, that it aims in directed manner to relate the number in the ROI 12 extracted image points as precisely as possible to the expected value thereof. After the extraction of image points potentially belonging to a vehicle lane marking and their subsequent digitization 33, these are collected in process step 24 for a further processing (for example within 35) for marking objects (pixel groups).

After the generation of marking objects, these can be examined in process step 27 with respect to their correspondence with the known morphological characteristics of the vehicle lane markings. Herein in advantageous manner for example the size of the marking objects, their roundness, the individual image points (pixels), or the number of free spaces within the marking objects (compactness, clustering) are evaluated, as to whether they can satisfy the criteria of the morphological characteristics of the vehicle lane markings on the basis of a priori knowledge. Based upon this determination, each pixel group, which satisfies the criteria of a vehicle lane marking, is considered to be an actual marking object and is characterized by the image coordinates. For this, in advantageous manner, the coordinates of the center of gravity of the marking image associated pixel group can be selected as the characterizing image coordinates.

After successful characterization of the marking object, the image coordinates can be employed, using curve regression, in order to describe the boundaries of the own vehicle track or in certain cases, the course of the vehicle track as well as the own position with respect to the the vehicle lane center. It is then particularly useful to supply this description to the inventive evaluation process for parameter determination (for example a Kalman-filter) for repositioning of the ROI within the image data.

The invention process is, of course, not limited to the recognition of dot-shaped vehicle lane markers. It is also possible therewith, for example, to recognize continuous linear vehicle lane markings even when these have been strongly degraded by changes or wear.

What is claimed is:

1. A process for recognition of vehicle lane markings from image data, comprising:
    evaluating morphological characteristics of vehicle lane markings using a priori knowledge, and
    using a matched-filter in order to extract image points, which are associated with vehicle lane markers, by measuring the average gray value of the background in the environment of the position to be examined, and evaluating an image point, which is potentially to be associated with the vehicle lane marking, on the basis of a comparison between background noise, the average gray value in the environment, and a gray value of the position to be examined.

2. The process according to claim 1, wherein from the image data, areas are extracted for processing, in which vehicle lane markings are contained with high probability based upon a priori knowledge.

3. The process according to claim 2, wherein the a priori knowledge is based upon at least one of:
    a camera geometry,
    a geometry of the vehicle track,
    dimensions of the vehicle lane markings and
    a vehicle position.

4. The process according to claim 2, wherein in initialization of the process for recognition of vehicle lane markings model parameters are varied at random sequence so long until vehicle lane markings are found.

5. The process according to claim 4, wherein the model parameter draws upon at least one of:
    the width of the vehicle lane,
    orientation of the camera with respect to the center of the vehicle lane and
    the yaw angle of the vehicle.

6. The process according to claim 2, wherein for repositioning of already initialized ROI parameter predictions, a vehicle street model based on a prediction of an evaluation process is drawn upon for parameter determination.

7. The process according to claim 6, wherein the evaluation process for parameter determination is based upon a Kalman-filter.

8. The process according to claim 6, wherein in the repositioning of the ROI, its values are controlled by variation of the result values of the prediction of the Kalman-filter, when the width is adapted proportionally to the size of the variation of the results.

9. The process according to claim 2, wherein the ROI is limited vertically on the basis of a minimal and a maximal distance in the street plane.

10. The process according to claim 9, wherein in particular in application of the process at night, the vertical limitation of the ROI is determined by the area of the maximal illumination (high beam, low beam).

11. The process according to claim 9, wherein the limitation is controlled by the number of the image points expected to be associated with the vehicle lane marker, and this control or regulation is optimal when the number of the image points to be expected is constant for all distance ranges.

12. The process according to claim 1, wherein the matched-filter is adapted in shape and size to the vehicle lane marking being searched for and/or to the statistic of the background.

13. The process according to claim 1, wherein the matched-filter is implemented in separate form, in which x-y-components are presented separately.

14. The process according to claim 1, wherein in the evaluation of the matched-filter, only the x-component is evaluated.

15. The process according to claim 1, wherein after the extraction of the image points which are to be associated with vehicle lane markings, these are digitized, wherein the intensities of the individual image points are compared with a threshold value, and the image points are only then drawn upon for further evaluation when their intensity exceeds this threshold.

16. The process according to claim 15, wherein the threshold value is determined from background noise using a threshold value regulator or controller.

17. The process according to claim 1, wherein after the extraction of image points potentially belonging to a vehicle lane marker and subsequent digitization, these image points are collected for the further processing into marker objects.

18. The process according to claim 1, wherein in the evaluation of the morphological characteristics of the vehicle lane marker, at least one of:
    the size of the marking object, group of image points
    the roundness of the image point group and
    the distribution of the image points or the number of empty spaces within the image point group is evaluated with respect to whether they satisfy criteria of a vehicle lane marker defined in accordance with a priori knowledge.

19. The process according to claim 18, wherein each image point group, which satisfies the criteria of a vehicle lane marker, is considered to be an actual marker object and is characterized by its image coordinates.

20. The process according to claim 19, wherein as characterizing image coordinates, the coordinates of the center of gravity of the image point group associated with the marking object is selected.

21. The process according to claim 17, wherein the characteristic image coordinates of the marking object are employed in order with curve regression to describe the boundaries of the own vehicle lane with respect to the course of the vehicle track, as well as to describe the own position with respect to the vehicle lane center, and that this description is provided to an estimation process for parameter determination for repositioning of the ROI within the image data.

22. A process for recognition of vehicle lane markings from image data, comprising:
    evaluating morphological characteristics of vehicle lane markings using a priori knowledge,
    using a matched-filter in order to extract image points, which are associated with vehicle lane markers, by measuring the average gray value of the background in the environment of the position to be examined, and evaluating an image point, which is potentially to be associated with the vehicle lane marking, on the basis of a comparison between background noise, the average gray value in the environment, and a gray value of the position to be examined,
    wherein after the extraction of the image points, which are to be associated with vehicle lane markings, these are digitized,
    wherein the intensities of the individual image points are compared with a threshold value, and the image points are only then drawn upon for further evaluation when their intensity exceeds this threshold, wherein the threshold value is determined from background noise using a threshold value regulator or controller, and wherein the threshold value regulator draws upon a priori knowledge regarding the expected surfaces occupied by the vehicle lane markings, which are directly correlated with the expected number of image points associated with the vehicle lane markings, and wherein the threshold value regulator or controller thereupon aims to supply the number of the image points extracted in the ROI preferably exactly to this expected value.

* * * * *